United States Patent
Weissenborn et al.

(10) Patent No.: US 9,776,518 B2
(45) Date of Patent: Oct. 3, 2017

(54) SYSTEM WITH BATTERY CHARGING DEVICE AND VEHICLE ELECTRICAL SYSTEM POWER SUPPLY STAGE

(75) Inventors: Erik Weissenborn, Stuttgart (DE); Jochen Fassnacht, Calw (DE)

(73) Assignee: Robert Bosch GmbH, Stuttgart (DE)

(*) Notice: Subject to any disclaimer, the term of this patent is extended or adjusted under 35 U.S.C. 154(b) by 513 days.

(21) Appl. No.: 14/233,793

(22) PCT Filed: May 21, 2012

(86) PCT No.: PCT/EP2012/059326
§ 371 (c)(1),
(2), (4) Date: Jan. 31, 2014

(87) PCT Pub. No.: WO2013/010693
PCT Pub. Date: Jan. 24, 2013

(65) Prior Publication Data
US 2014/0159661 A1 Jun. 12, 2014

(30) Foreign Application Priority Data
Jul. 18, 2011 (DE) .................. 10 2011 079 315

(51) Int. Cl.
*H02J 7/00* (2006.01)
*B60L 11/18* (2006.01)
(52) U.S. Cl.
CPC ......... *B60L 11/1811* (2013.01); *H02J 7/0003* (2013.01)
(58) Field of Classification Search
USPC .............. 320/109, 111, 140, 145, 138, 116
See application file for complete search history.

(56) References Cited

U.S. PATENT DOCUMENTS

| | | | |
|---|---|---|---|
| 5,909,360 A * | 6/1999 | Lavin | H02J 9/062 307/45 |
| 2004/0135544 A1* | 7/2004 | King | B60L 11/185 320/116 |

(Continued)

FOREIGN PATENT DOCUMENTS

| CN | 1797912 | 7/2006 |
|---|---|---|
| CN | 101018019 | 8/2007 |
| DE | 19809399 | 2/1999 |

OTHER PUBLICATIONS

International Search Report for Application No. PCT/EP2012/059326 dated Nov. 6, 2012 (English Translation, 2 pages).

*Primary Examiner* — Brian Ngo
(74) *Attorney, Agent, or Firm* — Michael Best & Friedrich LLP

(57) ABSTRACT

The invention relates to a system (100) with a battery charging device (20) with output terminals and an vehicle electrical system power supply stage (10). The vehicle electrical system power supply stage has a step-up/step-down converter (12), which is designed to raise an input voltage of the vehicle electrical system power supply stage to an intermediate circuit voltage, a direct current intermediate circuit (13), which is coupled to the step-up/step-down converter (12) at intermediate circuit nodes (14a, 14b), and a vehicle electrical system d.c.-d.c. converter (11), which is coupled to the direct voltage intermediate circuit at the intermediate circuit nodes, and which is designed to convert the intermediate circuit voltage into a direct voltage for a vehicle electrical system (1, 2), the output terminals of the battery charging device (20) being coupled to the direct voltage intermediate circuit (13) via the intermediate circuit nodes (14a, 14b).

7 Claims, 2 Drawing Sheets

(56) References Cited

U.S. PATENT DOCUMENTS

| | | |
|---|---|---|
| 2006/0103359 A1 | 5/2006 | Watanabe et al. |
| 2009/0103341 A1* | 4/2009 | Lee ........................ H02J 7/022 363/124 |
| 2010/0231169 A1 | 9/2010 | Hashim et al. |
| 2012/0126755 A1* | 5/2012 | Perisic ................ B60L 11/1811 320/145 |

* cited by examiner

SYSTEM WITH BATTERY CHARGING DEVICE AND VEHICLE ELECTRICAL SYSTEM POWER SUPPLY STAGE

BACKGROUND OF THE INVENTION

The invention relates to a system having a battery charging device and an onboard electrical power supply stage, said system having a step-up/step-down converter which is jointly used, in particular for the voltage supply of the onboard electrical power supply of an electrically operated vehicle.

A DC voltage converter for an onboard electrical power supply of an electrically operated vehicle often consists of an electrically isolating DC voltage converter and an adjustment stage connected upstream thereof, so that the DC voltage converter can be used in an optimum manner. In particular, in the case of galvanically decoupled DC voltage converters, it is advantageous for an optimum function of the DC voltage converter to work at a constant voltage ratio between input and output voltage, with the result that the circuit must only be designed for a relatively small operating voltage range which makes it possible to design the components for galvanic decoupling, for example a transformer, in a cost-effective manner.

A battery charging device, for example for an energy store of electrically operated vehicles, often consists of a rectifier and a power factor correction stage and an electrically isolated DC voltage converter. The DC voltage converter of a battery charging device often cannot be designed for the entire voltage adjustment range, in particular in the event of a large input and/or output voltage range, with the result that DC voltage converters of this type are either expensive in terms of design or may not work effectively.

The document US 2006/0103359 A1 discloses, for example, a DC voltage converter with improved design for charging a low-voltage battery using a charging device which is designed for charging a high-voltage battery.

SUMMARY OF THE INVENTION

According to one embodiment, the present invention provides a system having a battery charging device with output connections, and an onboard electrical power supply stage. The onboard electrical power supply stage has a step-up/step-down converter, which is designed to step up an input voltage of the onboard electrical power supply stage into an intermediate circuit voltage, a DC voltage intermediate circuit, which is coupled to the step-up/step-down converter at intermediate circuit nodes, and an onboard electrical power supply DC voltage converter, which is coupled to the DC voltage intermediate circuit at the intermediate circuit nodes and which is designed to convert the intermediate circuit voltage into a DC voltage for an onboard electrical power supply, wherein the output connections of the battery charging device are coupled to the DC voltage intermediate circuit via the intermediate circuit nodes.

According to another embodiment, the invention provides an electrically operated vehicle having a system according to the invention, a traction battery, which is designed to feed an input voltage into the onboard electrical power supply stage of the system, an onboard electrical power supply having an onboard electrical power supply battery, which onboard electrical power supply is designed to receive the DC voltage of the onboard electrical power supply stage of the system, and charging connections, which are connected to the battery charging device and which are designed to have applied thereto a supply voltage for charging the onboard electrical power supply battery and the traction battery.

According to another embodiment, the present invention provides a method for charging a traction battery and an onboard electrical power supply battery of an electrically operated vehicle, having the steps of rectifying and stepping up a supply voltage into an intermediate circuit voltage using a battery charging device, feeding the voltage into an intermediate circuit, converting, by means of a DC voltage converter, the intermediate circuit voltage from the intermediate circuit into a first supply voltage for charging the onboard electrical power supply battery using the battery charging device, and, at the same time, stepping down, by means of a step-up/step-down converter, the intermediate circuit voltage from the intermediate circuit into a second supply voltage for charging the fraction battery using the battery charging device.

One concept of the present invention is to use the adjustment stage of an onboard electrical power supply stage both for the DC voltage converter for the onboard electrical power supply and for a battery charging device. In this way, it is possible to design the DC voltage converter of the onboard electrical power supply stage and the battery charging device for a similar power or a similar input or output voltage level. Where a step-up/step-down converter is used as adjustment stage, a DC voltage intermediate circuit of the onboard electrical power supply stage can be connected both to the DC voltage converter of the onboard electrical power supply stage and to the output connections of the battery charging device.

Firstly, this offers the advantage that a separate step-down transformer at the output of the charging device can be dispensed with in the battery charging device. Secondly, the battery charging device can be designed for the intermediate circuit voltage of the onboard electrical power supply stage, which has an almost constant voltage level and hence enables an optimum design of the voltage-converting components of the battery charging device.

Furthermore, the battery charging device can advantageously be operated with an increased output power, since both the onboard electrical power supply, via the DC voltage converter of the onboard electrical power supply stage, and a high-voltage electrical power supply, such as a traction battery, for example, via the step-up/step-down converter, can be supplied with current by means of the battery charging device at the same time. As a result, the power fed into the DC voltage intermediate circuit by the battery charging device is divided, with the result that both the DC voltage converter and the step-up/step-down converter must only be designed for in each case a fraction of the total power provided by the battery charging device.

Moreover, the degree of efficiency of the onboard electrical power supply stage is improved in the event of charging an energy store of the onboard electrical power supply, since the transmission power of the battery charging device does not have to be conducted via the step-up/step-down converter but rather can be directly output to the onboard electrical power supply.

A further advantage consists in that a non-electrically isolating battery charging device with a corresponding power design can consist only of a power factor correction stage, since the step-up/step-down converter of the onboard electrical power supply stage is already present in the system as step-down transformer for the battery charging device.

Advantageously, the onboard electrical power supply DC voltage converter can be galvanically decoupled. Specifically galvanically decoupled DC voltage converters are limited in their power design by the components used for galvanic decoupling. Therefore, the system offers the advantage with the jointly used step-up/step-down converter of providing both an adjustment stage for the onboard electrical power supply DC voltage converter and the battery charging device.

In a preferred embodiment, the battery charging device can have a power factor correction stage, which is designed to convert a supply voltage of the battery charging device into a charging voltage and to supply the charging voltage to the output connections. By means of the power factor correction stage, the voltage level of the charging voltage can be adjusted to the intermediate circuit voltage.

Advantageously, the battery charging device can also have a line filter, which is connected to the power factor correction stage and which is designed to filter interference signals from the supply voltage, which can be applied to input connections of the line filter, and to supply said supply voltage to the power factor correction stage as filtered supply voltage. In particular when the onboard electrical power supply is supplied with current from an electrical power supply apparatus, for instance a charging station for an energy store of the onboard electrical power supply, this can be advantageous in order to effectively suppress interference signals from the electrical power supply apparatus.

In addition, the battery charging device can also have a galvanically decoupled DC voltage converter, which is coupled between the power factor correction stage and the output connections and which is designed to convert the voltage level of the charging voltage. By means of the galvanic decoupling, the electromagnetic compatibility and the security of the system can be improved further.

In an advantageous embodiment, the step-up/step-down converter can be designed to step down the charging voltage supplied by the battery charging device. In this way, the battery charging device can charge both a traction battery and an energy store of the onboard electrical power supply equally. Owing to the division of the charging energy, the total power of the battery charging device can be increased without the power input capability of the step-up/step-down converter or the onboard electrical power supply DC voltage converter having to be increased.

BRIEF DESCRIPTION OF THE DRAWINGS

Further features and advantages of embodiments of the invention emerge from the following description with reference to the appended drawings.

In the drawings.

DETAILED DESCRIPTION

Figure 1:
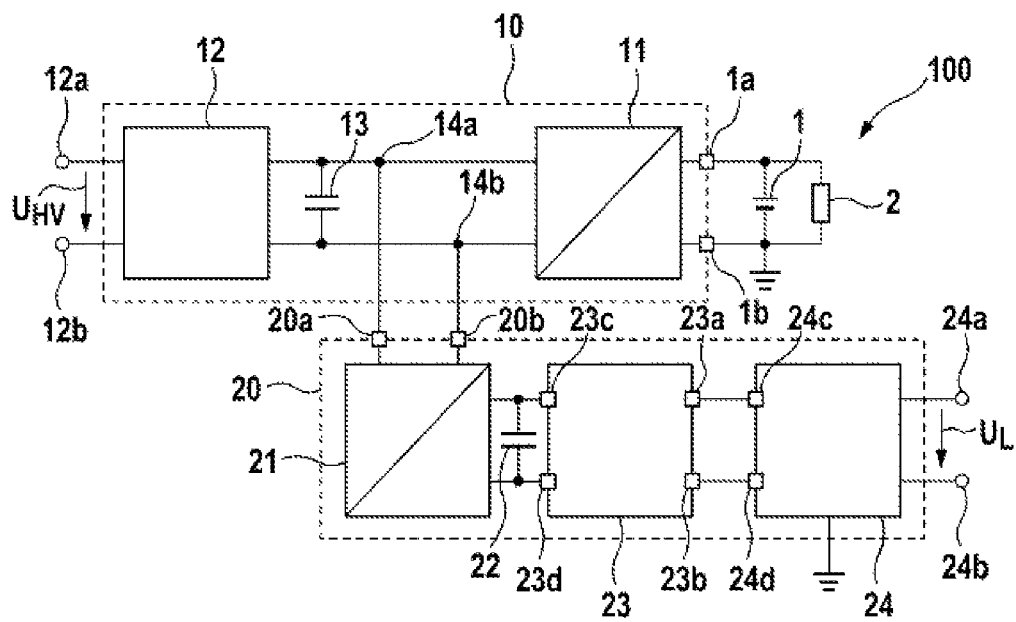
FIG. 1 shows a schematic illustration of a system having a battery charging device and an onboard electrical power supply stage according to one embodiment of the present invention.

FIG. 1 shows a schematic illustration of a system 100 having a battery charging device 20 and an onboard electrical power supply stage 10, which can, for example, supply the 12 V onboard electrical power supply. The onboard electrical power supply stage 10 can have an onboard electrical power supply DC voltage converter 11, a DC voltage intermediate circuit 13 and a step-up/step-down converter 12. An input voltage $U_{HV}$ can be applied to the input connections 12a, 12b of the onboard electrical power supply stage 10, said input voltage being, for example, an input voltage from an intermediate circuit of a high-voltage power supply system, for example a traction battery of an electrically operated vehicle such as a hybrid vehicle or an electric car. The input voltage $U_{HV}$ can be, for example, between 50 V and 500 V and can be stepped up by the step-up/step-down converter 12. In this case, the step-up/step-down converter 12 can step up the input voltage $U_{HV}$ by at least 25 V, for example, in order to ensure sufficient control.

Figure 2:
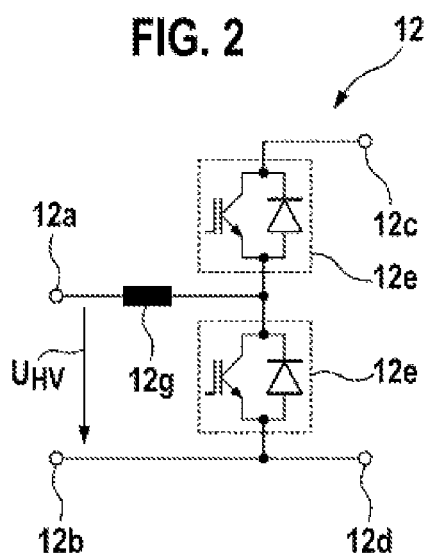
FIG. 2 shows a schematic illustration of a step-up/step-down converter according to another embodiment of the present invention.

An exemplary embodiment of a step-up/step-down converter 12 is shown in the schematic illustration in FIG. 2. The step-up/step-down converter 12 in FIG. 2 has two input connections 12a and 12b, to which an input voltage $U_{HV}$ can be applied. The input connection 12a is connected via a storage inductor 12g to a node between two parallel circuits 12e and 12f, composed in each case of a switching element, for example a semiconductor switch such as a MOSFET switch, an IGBT switch or a BJT switch, and a freewheeling diode. Owing to the switching element of the parallel circuit 12f and the freewheeling diode of the parallel circuit 12e, it is possible to ensure a step-up function of the step-up/step-down converter 12 with the aid of the storage inductor 12g, with the result that an output voltage is present at the output connections 12c and 12d of the step-up/step-down converter 12, which output voltage has been stepped up compared to the input voltage $U_{HV}$.

The stepped-up input voltage $U_{HV}$ is fed as intermediate circuit voltage into the DC voltage intermediate circuit 13 of the onboard electrical power supply stage 10 by the step-up/step-down converter 12. The intermediate circuit voltage can in this case be constant or almost constant, in contrast to the input voltage $U_{HV}$, which fluctuates owing to the varying conditions. Hence, a constant voltage level can be ensured as input voltage for the DC voltage converter 11, which can be designed in a relatively small operating range as a result. The DC voltage converter 11 of the onboard electrical power supply stage 10 converts the intermediate circuit voltage from the DC voltage intermediate circuit 13 into an onboard electrical power supply voltage, that is to say a DC voltage for the onboard electrical power supply, which can be supplied to output connections 1a, 1b of the onboard electrical power supply stage 10 for the onboard electrical power supply. By way of example, an energy store 1 of the onboard electrical power supply or an electrical load 2 can be supplied by the DC voltage across the output connections 1a, 1b. In this case, the onboard electrical power supply voltage can be, for example, 12 V or 14 V.

The DC voltage converter 11 of the onboard electrical power supply stage 10 can preferably be a galvanically decoupled, that is to say electrically isolating, DC voltage converter 11. This can contribute to ensuring the electrical safety with respect to high voltages and the electromagnetic compatibility in the onboard electrical power supply connected on the secondary side. In particular in the case of electrically operated vehicles, it can be provided for reasons of safety that a galvanically decoupled DC voltage converter 11 is used, with the result that there is no risk from the high voltages from the electrical power supply of the traction battery to users of the vehicle, who have free access to the 12 V onboard electrical power supply or a similar onboard electrical power supply with a non-hazardous operating voltage and, in particular, the energy store 1 of the onboard electrical power supply.

The battery charging device 20 can have charging connections 24a, 24b, to which a supply voltage $U_L$ can be applied. The supply voltage $U_L$, for example, can be supplied by a charging station, an electrical power supply connection or a similar electrical power supply apparatus. In this case, the supply voltage $U_L$ can be an AC voltage and have a voltage level of 100 V to 260 V, for example.

Figure 4:
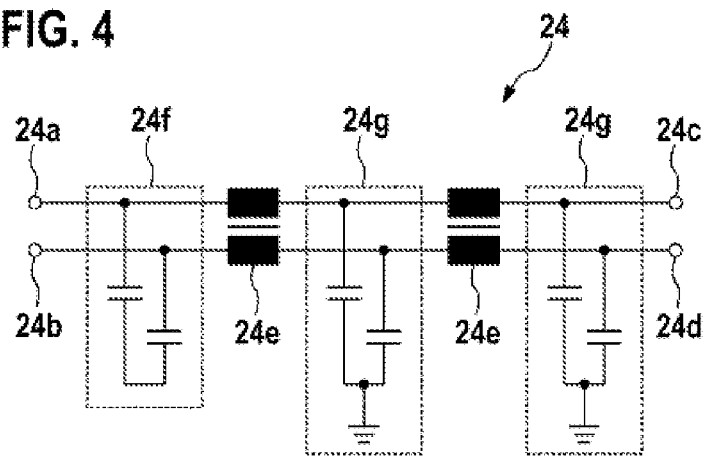
FIG. 4 shows a schematic illustration of a line filter according to another embodiment of the present invention.

The charging connections 24a, 24b can be input connections of a line filter 24 of the battery charging device 20. An exemplary embodiment of a line filter 24 is shown in the schematic illustration in FIG. 4. The line filter 24 in FIG. 4 can in this case have inductors 24e and filter stages 24f, 24g. In this case, the inductors 24e can comprise current-compensated inductors 24e, which, for example, can be designed to filter common-mode interference signals of the supply voltage $U_L$ across the charging connections 24a, 24b. The filter stages can comprise interference-suppression capacitors connected between the charging connections 24a, 24b. FIG. 4 shows, by way of example, a filter stage 24f which comprises so-called X capacitors for suppressing differential-mode interference signals on the phase and neutral conductors, and filter stages 24g which comprises so-called Y capacitors for suppressing common-mode interference signals between phase/neutral conductors and the protective conductor. In this case, a filtered supply voltage $U_L$ can be supplied at the output connections 24c, 24d of the line filter 24. The number and design of the individual filter stages 24f, 24g and inductors 24e can be different from the number and design shown in FIG. 4 and be adapted to the respective application range, voltage range and power range.

Figure 3:
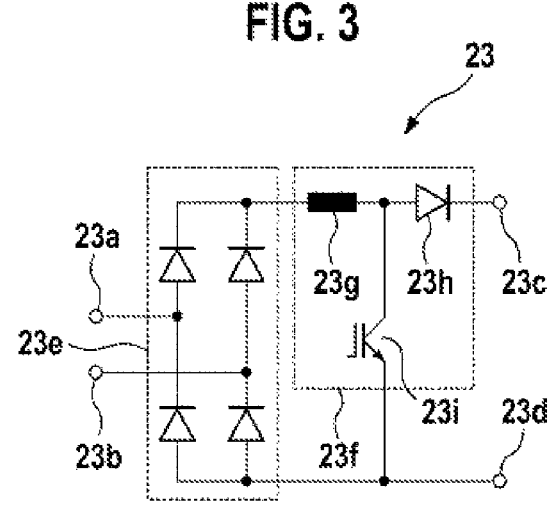
FIG. 3 shows a schematic illustration of a power factor correction stage according to another embodiment of the present invention.

The output connections 24c, 24d of the line filter 24 can be connected to input connections 23a, 23b of a power factor correction stage 23. An example of a possible configuration of the power factor correction stage 23 is shown in the schematic illustration in FIG. 3. The power factor correction stage 23 comprises a rectifier stage 23e, which can comprise a full-bridge circuit of diodes, and a step-up transformer 23f, which can comprise, for example, a storage inductor 23g, a freewheeling diode 23h and a switching element 23i, for example a semiconductor switch such as a MOSFET switch, an IGBT switch or a BJT switch. In this case, the power factor correction stage 23 can be used, for example, for reactive power compensation of the power output by an electrical power supply apparatus to the battery charging device 20. A charging voltage, in particular a DC voltage, can be provided at the output connections 23c, 23d of the power factor correction stage 23 for an intermediate circuit 22 which is internal to the charging device.

The battery charging device 20 can furthermore have a DC voltage converter 21, in particular a galvanically decoupled DC voltage converter 21, which converts the charging voltage in the intermediate circuit 22 into the voltage level and can output to the output connections 20a, 20b of the battery charging device 20.

The battery charging device 20 is connected to intermediate circuit nodes 14a, 14b of the onboard electrical power supply stage 10 via the output connections 20a, 20b. In this way, an output voltage level of the battery charging device 20 can be used when charging the energy store 1 of the onboard electrical power supply, which output voltage level is adapted to the intermediate circuit voltage of the DC voltage intermediate circuit 13 of the onboard electrical power supply stage 10. At the same time, the step-up/step-down converter 12 of the onboard electrical power supply stage 10 can be used as output-side or secondary-side step-down transformer of the battery charging device 20, if the battery charging device 20 is used to charge a traction battery of the high-voltage electrical power supply.

Figure 5:
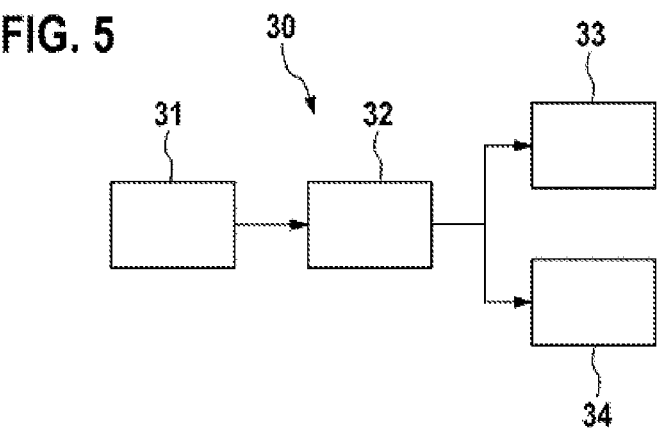
FIG. 5 shows a schematic illustration of a method for operating a system having a battery charging device and an onboard electrical power supply stage according to another embodiment of the present invention.

FIG. 5 shows a schematic illustration of a method 30 for charging a traction battery and an onboard electrical power supply battery, in particular when using the system 100 explained in connection with FIGS. 1 to 4. In a first step 31, a supply voltage $U_L$ is rectified and stepped up into an intermediate circuit voltage by means of a battery charging device 20. Here, for example, a battery charging device as shown in FIG. 1 can be used. In this case, the components of the battery charging device 20 can be designed for the voltage level of the intermediate circuit voltage.

In a second step 32, the intermediate circuit voltage is fed into an intermediate circuit, in particular the DC voltage intermediate circuit 13 of the onboard electrical power supply stage 10. It is advantageous, here, for the components of the onboard electrical power supply stage 10, in particular the step-up/step-down converter 12 of the onboard electrical power supply stage 10, to be designed for an intermediate circuit voltage which corresponds to the fed-in intermediate circuit voltage of the battery charging device 20.

In a third step 33 and a fourth step 34, in a charging mode, the intermediate circuit voltage from the DC voltage intermediate circuit 13 is converted by means of the DC voltage converter 11 into a first supply voltage for charging the onboard electrical power supply battery 1 by means of the battery charging device 20 and, at the same time, the intermediate circuit voltage from the intermediate circuit 13 is stepped down into a second supply voltage by means of the step-up/step-down converter 12 for charging a traction battery by means of the battery charging device 20. In this case, the step-up/step-down converter 12 is used as a secondary-side step-down transformer for the battery charging device 20.

This procedure offers the advantage that the traction battery and the onboard electrical power supply battery 1 can be charged at the same time with a higher charging power, for example 3.3 kW from the battery charging device 20, since a portion of the power, for example up to 500 W, flows via the DC voltage converter 11 into the onboard electrical power supply. In this case, the voltage level of the output voltage of the battery charging device 20 is already adapted to the intermediate circuit voltage of the DC voltage intermediate circuit 13 of the onboard electrical power supply stage 10, with the result that stepping down for adaptation to the DC voltage converter 11 is no longer necessary.

At the same time, the remaining portion of the charging power is output via the step-up/step-down converter 12 as step-down transformer into the high-voltage electrical power supply for charging the traction battery. Since a portion of the charging power is already flowing in the onboard electrical power supply, the step-up/step-down converter 12 does not have to be designed for the full charging power of the battery charging device 20 of, for example, 3.3 kW; rather, it can be designed for a lower power of, for example, 2.6 to 3 kW.

In the system 100, it is also possible, in principle, to integrate the DC voltage converter 11 for supplying the onboard electrical power supply into the battery charging device 20. In this case, it can be provided that the step-up/step-down converter 12 is replaced by a step-up/step-down converter 12 of the battery charging device 20.

Figure 6:
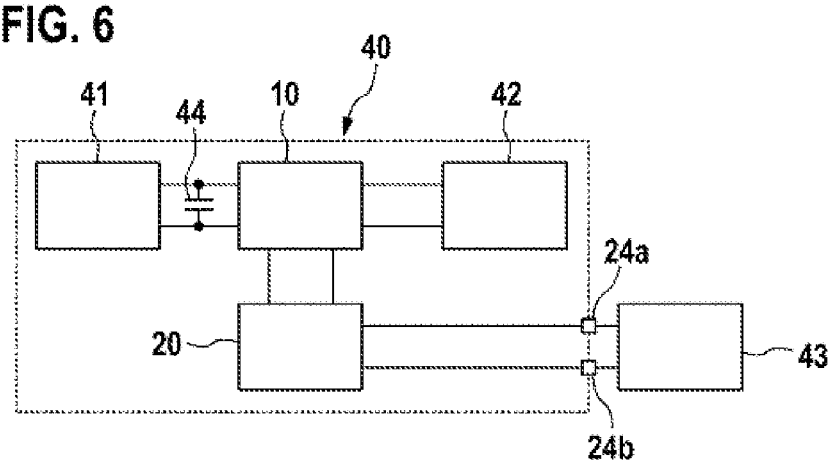
FIG. 6 shows a schematic illustration of an electrically operated vehicle having a system having a battery charging device and an onboard electrical power supply stage according to another embodiment of the present invention.

FIG. 6 shows an exemplary embodiment for the use of a system 100 in an electrically operated vehicle 40, for example a hybrid vehicle or an electric car. The vehicle 40 comprises a traction battery 41 which is connected to an onboard electrical power supply stage 10 via an intermediate circuit 44. The onboard electrical power supply stage 10 is designed to provide a supply voltage for an onboard electrical power supply 42 of the vehicle 40 and can, in this case in particular, correspond to the onboard electrical power supply stage 10 in FIG. 1. The onboard electrical power supply stage 10 is coupled to a battery charging device 20, as is likewise shown in FIG. 1. The battery charging device 20 can be, for example, a battery charging device 20 which is integrated into the vehicle 40 and be connected via charging connections 24a. 24b to an electrical power supply apparatus 43, for example a public electricity grid, a charging station or a similar apparatus. Alternatively, it is also possible for the battery charging device 30 to be connected to the vehicle 40 as an external device. In this case, the onboard electrical power supply stage 10 can have connections via which the external battery charging device 20 can be connected to the intermediate circuit nodes 14a, 14b of the onboard electrical power supply stage 10.

In this case, the traction battery 41 is designed to feed an input voltage into the onboard electrical power supply stage 10, which provides a supply voltage, in particular a DC voltage for the onboard electrical power supply 43 using an onboard electrical power supply battery 1. A supply voltage for charging the onboard electrical power supply battery 1 and the fraction battery 41 can be connected via the charging connections 24a, 24b, which are connected to the battery charging device 20.

The invention claimed is:
1. A system (100), having
   a battery charging device (20) with output connections (20a, 20b) and including a power factor correction stage (23), which is configured to convert a supply voltage (UL) of the battery charging device (20) into a charging voltage and to supply the charging voltage to the output connections (20a, 20b); and
   an onboard electrical power supply stage (10), which has:
      a step-up/step-down converter (12), which is configured to step up an input voltage (UHV) of the onboard electrical power supply stage (10) into an intermediate circuit voltage,
      a DC voltage intermediate circuit (13), which is coupled to the step-up/step-down converter (12) at intermediate circuit nodes (14a, 14b), and
      an onboard electrical power supply DC voltage converter (11), which is coupled to the DC voltage intermediate circuit (13) at the intermediate circuit nodes (14a, 14b) and which is configured to convert the intermediate circuit voltage into a DC voltage for an onboard electrical power supply;
   a traction battery (41), which is configured to feed an input voltage (UHV) into the onboard electrical power supply stage (10) of the system (100);
   an onboard electrical power supply (43) having an onboard electrical power supply battery (1), which onboard electrical power supply is configured to receive the DC voltage of the onboard electrical power supply stage (10) of the system (100); and
   charging connections (24a, 24b), which are connected to the battery charging device (20) and which are configured to have applied thereto a supply voltage (UL) for charging the onboard electrical power supply battery (1) and the traction battery (41);
   wherein the output connections (20a, 20b) of the battery charging device (20) are coupled to the DC voltage intermediate circuit (13) via the intermediate circuit nodes (14a, 14b).

2. The system (100) as claimed in claim 1, wherein the onboard electrical power supply DC voltage converter (11) is galvanically decoupled.

3. The system (100) as claimed in claim 1, wherein the battery charging device (20) also has:
   a line filter (24), which is connected to the power factor correction stage (23) and which is configured to filter interference signals from the supply voltage (UL) applied to input connections (24a, 24b) of the line filter (24), and to supply said supply voltage to the power factor correction stage (23) as filtered supply voltage.

4. The system (100) as claimed in claim 1, wherein the battery charging device (20) also has:
   a galvanically decoupled DC voltage converter (21), which is coupled between the power factor correction stage (23) and the output connections (20a, 20b) and which is configured to convert the voltage level of the charging voltage.

5. The system (100) as claimed in claim 1, wherein the step-up/step-down converter (12) is configured to step down the charging voltage supplied by the battery charging device (20).

6. An electrically operated vehicle or plug-in hybrid vehicle (40), having a system (100) as claimed in claim 1.

7. A method (30) for charging a traction battery (41) and an onboard electrical power supply battery (1) of an electrically operated vehicle or plug-in hybrid vehicle (40), having the steps of:
   rectifying and stepping up (31) a supply voltage (UL) into an intermediate circuit voltage using a battery charging device (20);
   feeding (32) the intermediate voltage into an intermediate circuit (13);
   converting (33), by a DC voltage converter (11), the intermediate circuit voltage from the intermediate circuit (13) into a first supply voltage for charging the onboard electrical power supply battery (1) using the battery charging device (20)_including a power factor correction stage (23), which is configured to convert a supply voltage (UL) of the battery charging device (20) into a charging voltage and to supply the charging voltage to output connections (20a, 20b); and,
   at the same time, stepping down (34), by a step-up/step-down converter (12), the intermediate circuit voltage from the intermediate circuit (13) into a second supply voltage for charging the traction battery (41) using the battery charging device (20).

* * * * *